(12) United States Patent
Ledingham

(10) Patent No.: US 6,591,978 B2
(45) Date of Patent: Jul. 15, 2003

(54) CONVEYOR BRACKET

(75) Inventor: Stuart J. Ledingham, Coto de Caza, CA (US)

(73) Assignee: Solus Industrial Innovations, LLC, Rancho Santa Margarita, CA (US)

( * ) Notice: Subject to any disclaimer, the term of this patent is extended or adjusted under 35 U.S.C. 154(b) by 0 days.

(21) Appl. No.: 10/213,757

(22) Filed: Aug. 6, 2002

(65) Prior Publication Data

US 2002/0189923 A1 Dec. 19, 2002

Related U.S. Application Data

(63) Continuation of application No. 09/612,066, filed on Jul. 7, 2000, now Pat. No. 6,427,829.

(51) Int. Cl.[7] .............................................. B65G 21/20
(52) U.S. Cl. ................................................... 198/836.3
(58) Field of Search ........................ 198/836.3, 810.01, 198/502.3, 502.1

(56) References Cited

U.S. PATENT DOCUMENTS

| 5,335,782 A | * | 8/1994 | Herzog ..................... 198/836.3 |
| 5,676,239 A | * | 10/1997 | Mason ..................... 198/836.3 |
| 5,797,481 A |   | 8/1998 | Uber et al. |
| 5,860,511 A | * | 1/1999 | Ensch et al. ............. 198/836.3 |

FOREIGN PATENT DOCUMENTS

EP    0 953 523 A2    11/1999

OTHER PUBLICATIONS

Value Engineering, Inc. (1998) Accessory Mount Assemblies, p. 86.
Value Engineering, Inc. (1998) Accessory Mount Components, p. 87.
Value Engineering, Inc. (1998) Guide Rail Brackets, p. 60.
Value Engineering, Inc. (1998) Rail Clamp Rods, p. 31.
Value Engineering, Inc. (1998) Rod Mount Brackets, p. 77.
Sitoplast by Marbett (Feb. 1995) Conveyor Accessories; Technical Data; Proximity–photocell support elements, pp. 120–121.

* cited by examiner

*Primary Examiner*—D. Glenn Dayoan
*Assistant Examiner*—Lori L Coletta
(74) *Attorney, Agent, or Firm*—Knobbe, Martens, Olson & Bear LLP

(57) ABSTRACT

A unitized vertical support for attaching auxiliary equipment to a conveyor system or other industrial application. The support is made of a tube having one end in a molded plastic base. When plastic is injected into the mold, plastic flows into the tube during the molding process, thus creating a unitized support which presents movement of the tube relative to the base.

21 Claims, 6 Drawing Sheets

CONVEYOR BRACKET

RELATED APPLICATIONS

This is a Continuation of U.S. patent application Ser. No. 09/612,066 filed on Jul. 7, 2000, now U.S. Pat. No. 6,427,829, which is incorporated herein by reference in its entirety and made part of this application.

BACKGROUND OF THE INVENTION

1. Field of the Invention

The present invention relates in general to a bracket or support used in assembly line and conveyor belt systems and, in particular, to an improved upright or vertical support for auxiliary devices or guide rail systems.

2. Description of the Related Art

Vertical members are commonly mounted to a conveyor system frame, packaging system frame, or other industrial application to support guide rails or auxiliary equipment for the system. For example, an electric eye that may be used for counting or inspection purposes is required to be mounted in close proximity to a conveyor without interfering with the system itself. To attach these auxiliary devices, an initial vertical member is attached to the frame and then additional elements are added to obtain the correct geometry for the application (FIG. 2). Typically, to attach the initial vertical member, a two-piece structure comprised of a clamp with a means for attachment to the system, and the vertical member is used. There are a variety of differing approaches that exist to implement the clamping system. In one variant, the clamping device is "T" shaped with a channel through the middle arm through which the rod is inserted. The arm includes a horizontal-action, resilient, clamping method to help hold the rod in place. In another variant, a bracket is attached to the system and the member inserted vertically and a screw is used to press the member against the bracket, holding it in place.

During usage, the attached vertical member must not rotate, or be subject to vertical slippage. Should either of these movements occur, further elements attached to the vertical member will become misaligned. For example, an electric eye, or proximity switch on a conveyor that is misaligned can cause serious production problems.

A variety and combination of materials have been used in an attempt to solve these problems. For example, a plastic clamp and a rod, a plastic bracket and a rod, a plastic rod and a metal bracket, and the like. However, insufficient friction is obtained when trying to compress plastic around steel rods; plastics fail to provide the strength and friction necessary to completely resist normal torsional loads, and plastic rods are easily damaged or misshapen by steel clamping methods. One common technique employed to avoid rotation is to use a square cross-sectional rod. This method will reduce axial rotation, unfortunately, it also limits the opportunity for attaching further optional implements, radially, to the rod.

Thus a need exists for a method of attaching a vertical member to various industrial applications that will not suffer from slippage or rotational problems. Additionally, to avoid inconvenience and unnecessary costs, this method should encompass the flexibility to adapt to a variety of geometries and specifications set by the user.

SUMMARY OF THE INVENTION

Briefly stated, a vertical support is provided utilizing a rigid tube connected to a plastic base by injection molding the base with the tube fixed in the mold. This results in injected plastic flowing into the tube, permanently fixing the tube to the base and providing a one-piece support. This eliminates the problem of support rods slipping or rotating within plastic bases that grip a rod utilizing nut and bolt arrangements. This technique also eliminates the labor of assembling and periodically checking or re-tightening of fasteners which is involved with supports having two or more separate pieces.

BRIEF DESCRIPTION OF THE DRAWINGS

Having thus summarized the general nature of the invention and its essential features and advantages, certain preferred embodiments and modifications thereof will become apparent to those skilled in the art from the detailed description herein having reference to the figures that follow, of which.

DETAILED DESCRIPTION OF THE PREFERRED EMBODIMENT

Figure 1:
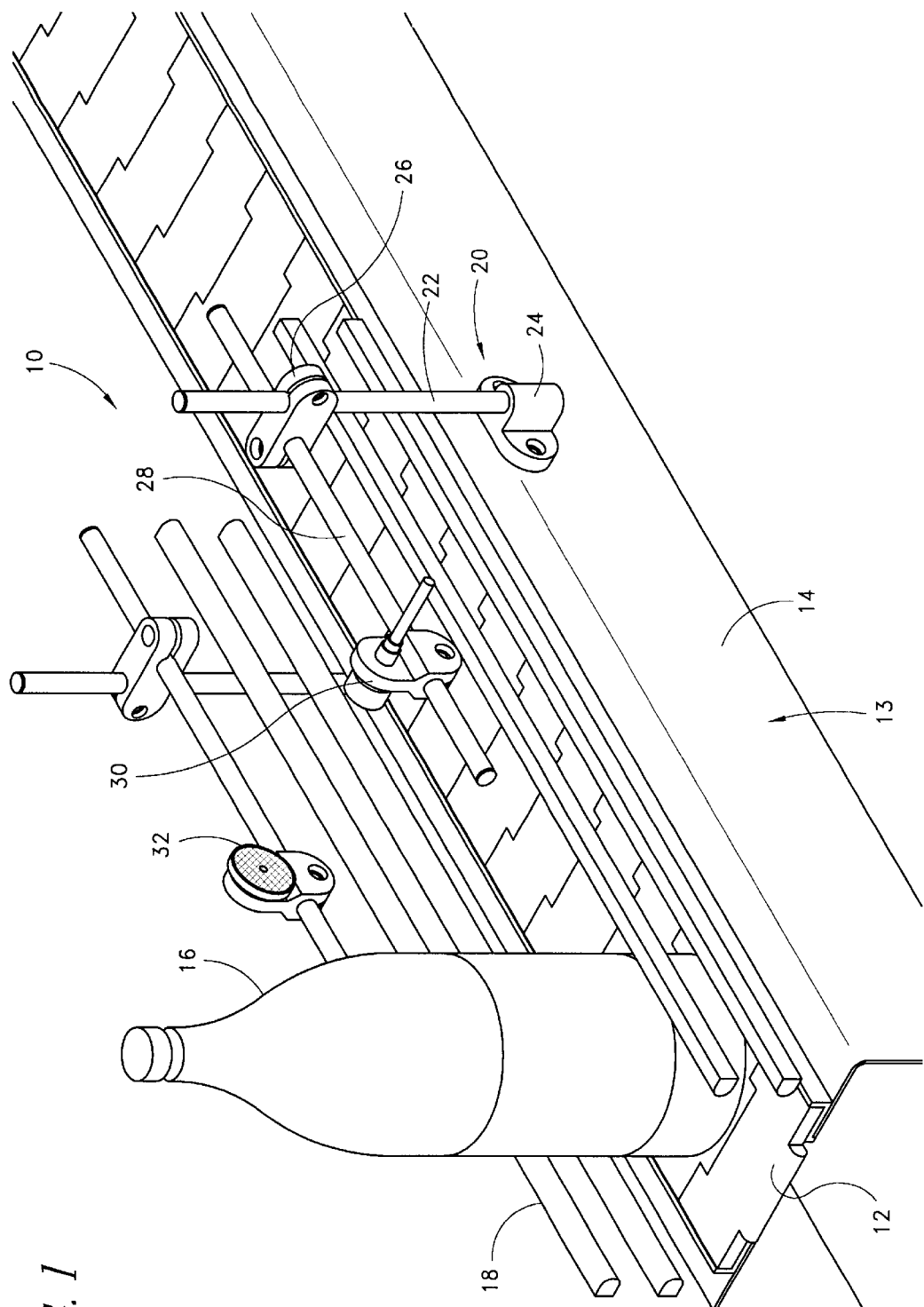
FIG. 1 is a schematic view of a typical conveyor system which shows a vertical rod, supporting auxiliary equipment.

Referring to FIG. 1, schematically illustrated is a conveyor system 10 including a conveyor chain 12 mounted on frame 13 having vertical side walls 14. A bottle 16 is illustrated on the conveyor chain being guided by guide rails 18 on each side of the conveyor chain. Mounted on each of the side walls is a unitized support 20 which includes an upright tube 22 secured to a base 24, which in turn is secured by fasteners to the frame 13. Mounted on the upper ends of the support members 22 is a conventional clamp 26. The clamp in turn supports a horizontally oriented rod 28 to which is attached another bracket 30 carrying a component related to the conveyor function such as a sensor 32 that monitors the movement of items on the conveyor belt. The system shown in FIG. 1 is typical except that the support 20 is an embodiment of this invention.

Figure 2:
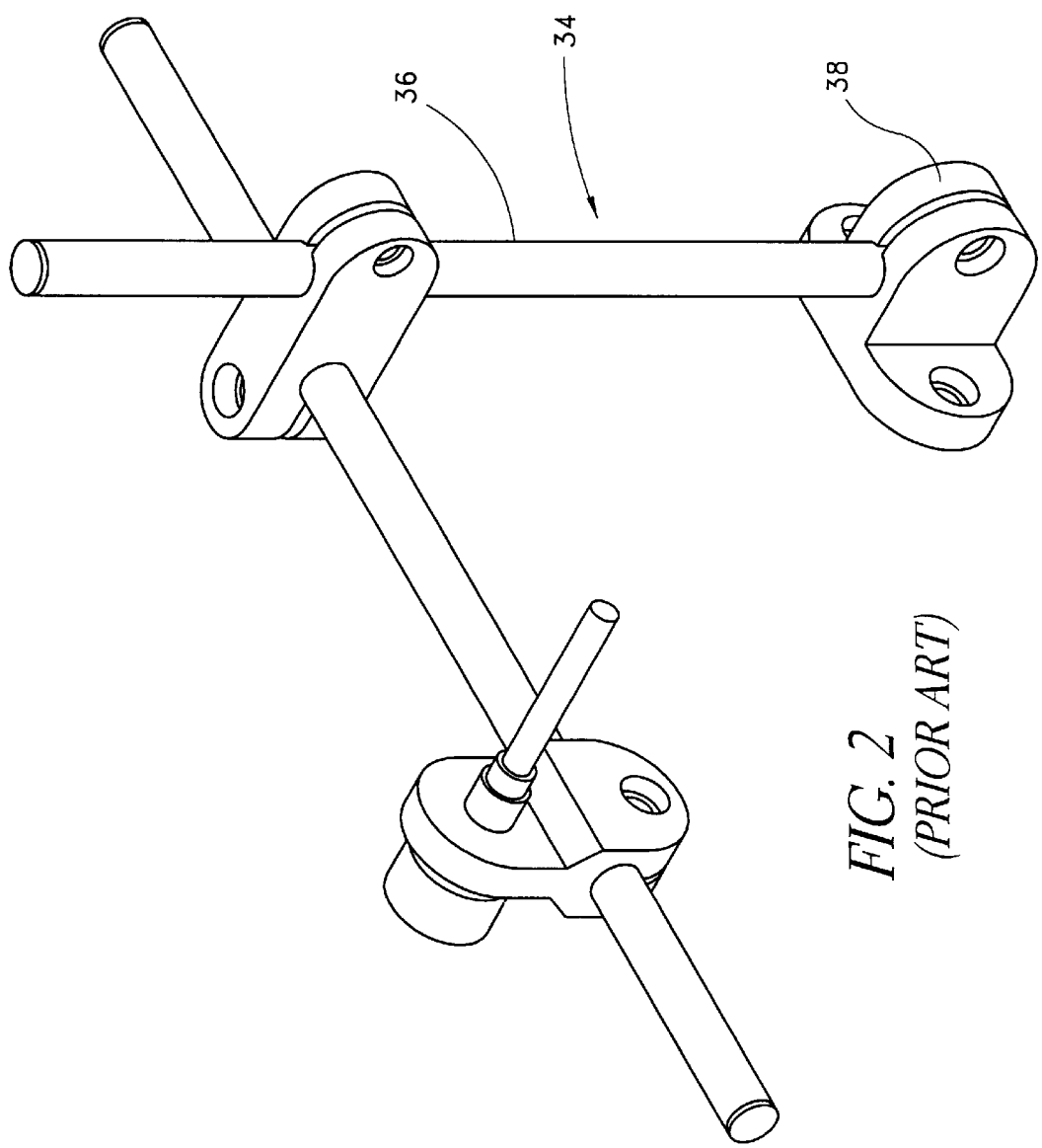
FIG. 2 is an isometric view of a typical prior art clamp and support rod.

FIG. 2 illustrates a prior art upright 34 that includes a rod or tube 36 extending through and gripped by two arms of a clamp 38. A nut and bolt combination force the arms toward each other to grip the rod. Thus, to utilize that type of clamp, the user must first insert the rod 36 through a hole between the clamp arms; then insert a bolt through the arms, and tighten a nut on the bolt. Such constructions are subject to loosening and thus, are subject to rotation and slippage problems. This, in turn, affects the accuracy of whatever sensing function is being performed by the device supported by the rod and clamp. The upright support carries all of the load of whatever accessory equipment is mounted on it, and hence, it is the most critical connection inasmuch as rotational or axial slippage on it affects everything mounted on the support.

Figure 3:
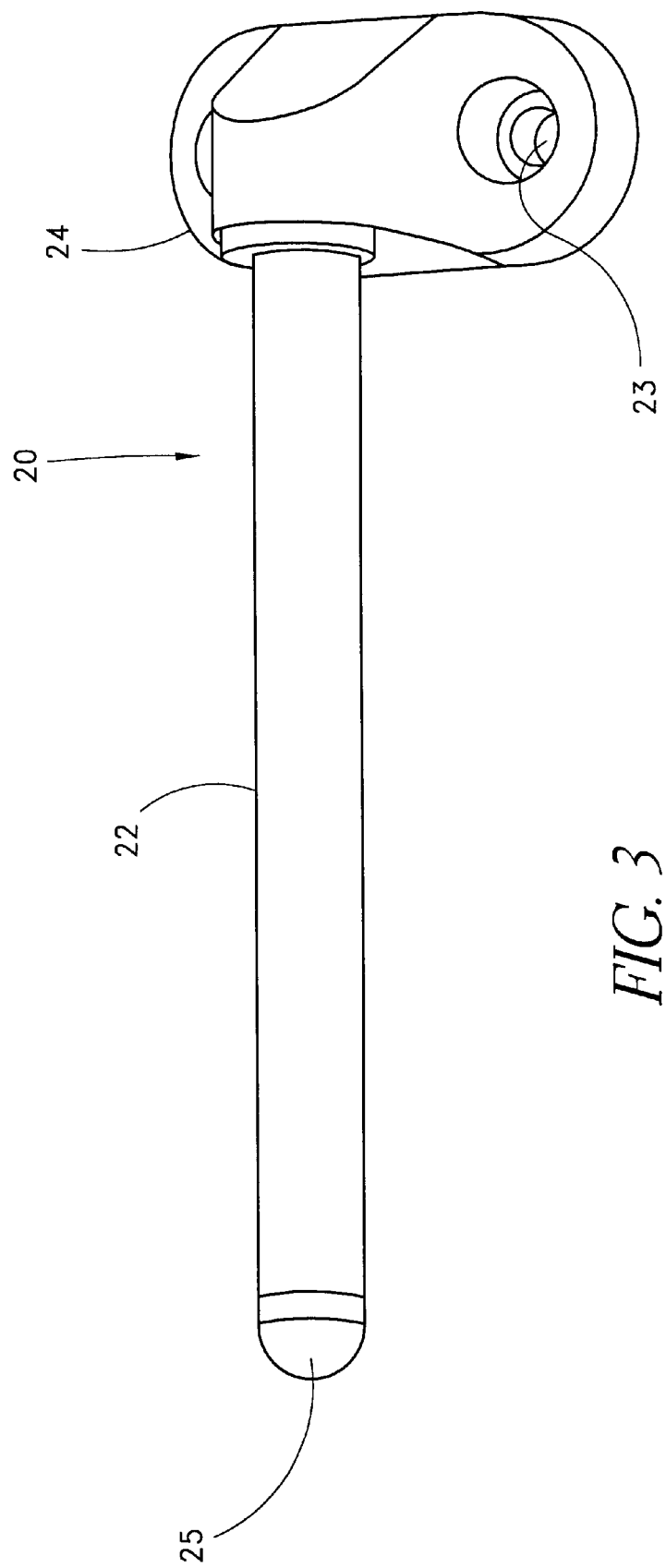
FIG. 3 is an isometric view of a preferred embodiment of this invention.

FIG. 3 illustrates in more detail the unitized support 20 illustrated in FIG. 1. As can be seen, the base 24 includes a pair of fastener holes 23 on each side of the base central portion which supports the tube 22. The base is formed of a moldable material such as plastic, and the plastic extends through the tube and forms a cap 25 on the upper end of the support. This integral construction prevents rotation of the tube relative to the base in view of the large functional area within the tube.

Figure 4:
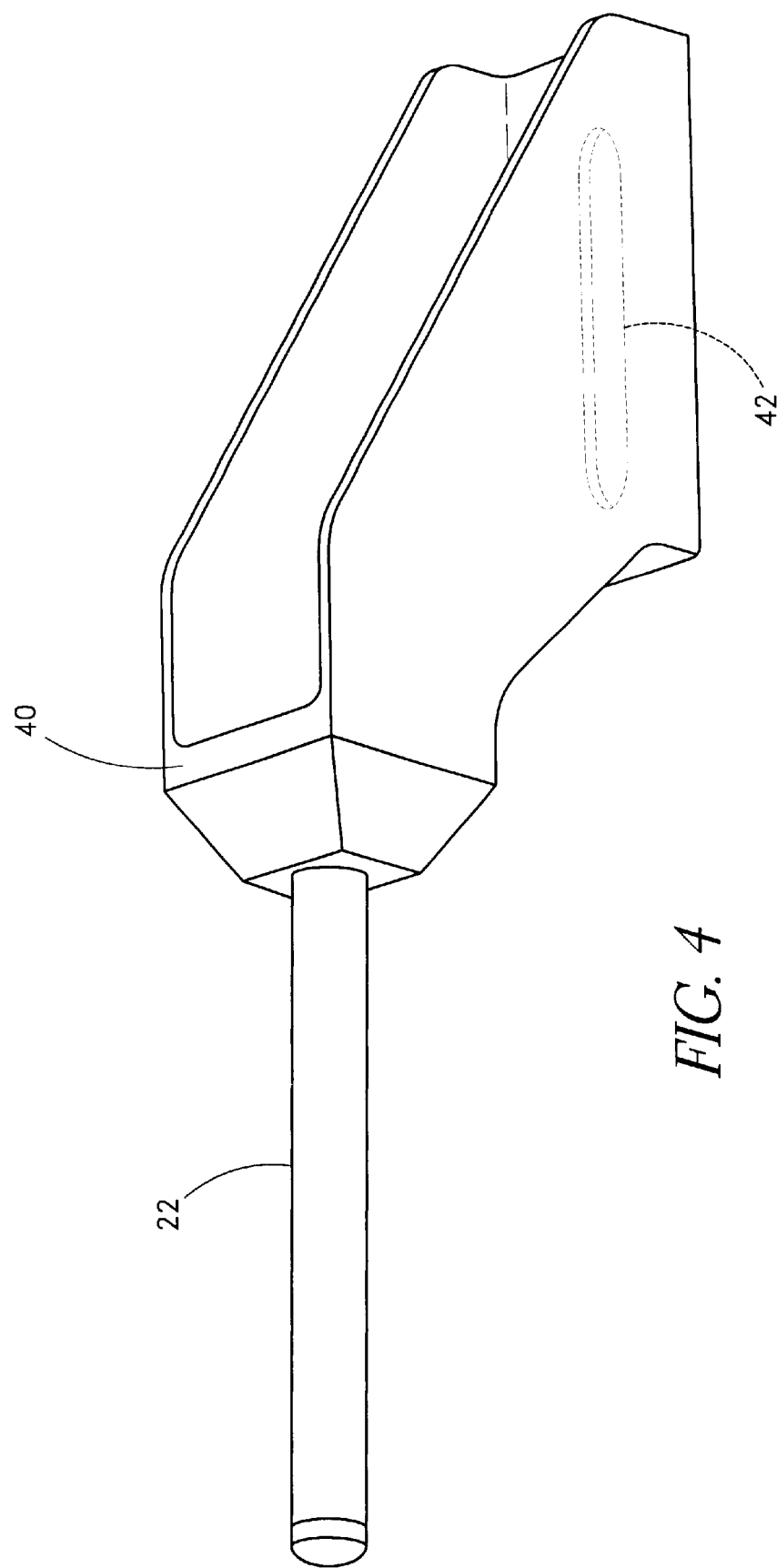
FIG. 4 is an isometric view of another preferred embodiment of this invention.

FIG. 4 illustrates another form of the invention in which the upright member 22 is supported directly by a bracket base 40 without the need for other fasteners. A slot 42 for mounting the bracket on the side of the conveyor or other frame is situated between the two side walls of the bracket. This support is also formed of a rigid tube filled with the plastic or other moldable material and formed integral with the base. It should, of course, be recognized that a multitude of other base configurations may be employed, but all having the common inventive feature of the upright being supported by the base in a fashion not requiring other fasteners to grip the rod.

Figures 5, 5A:
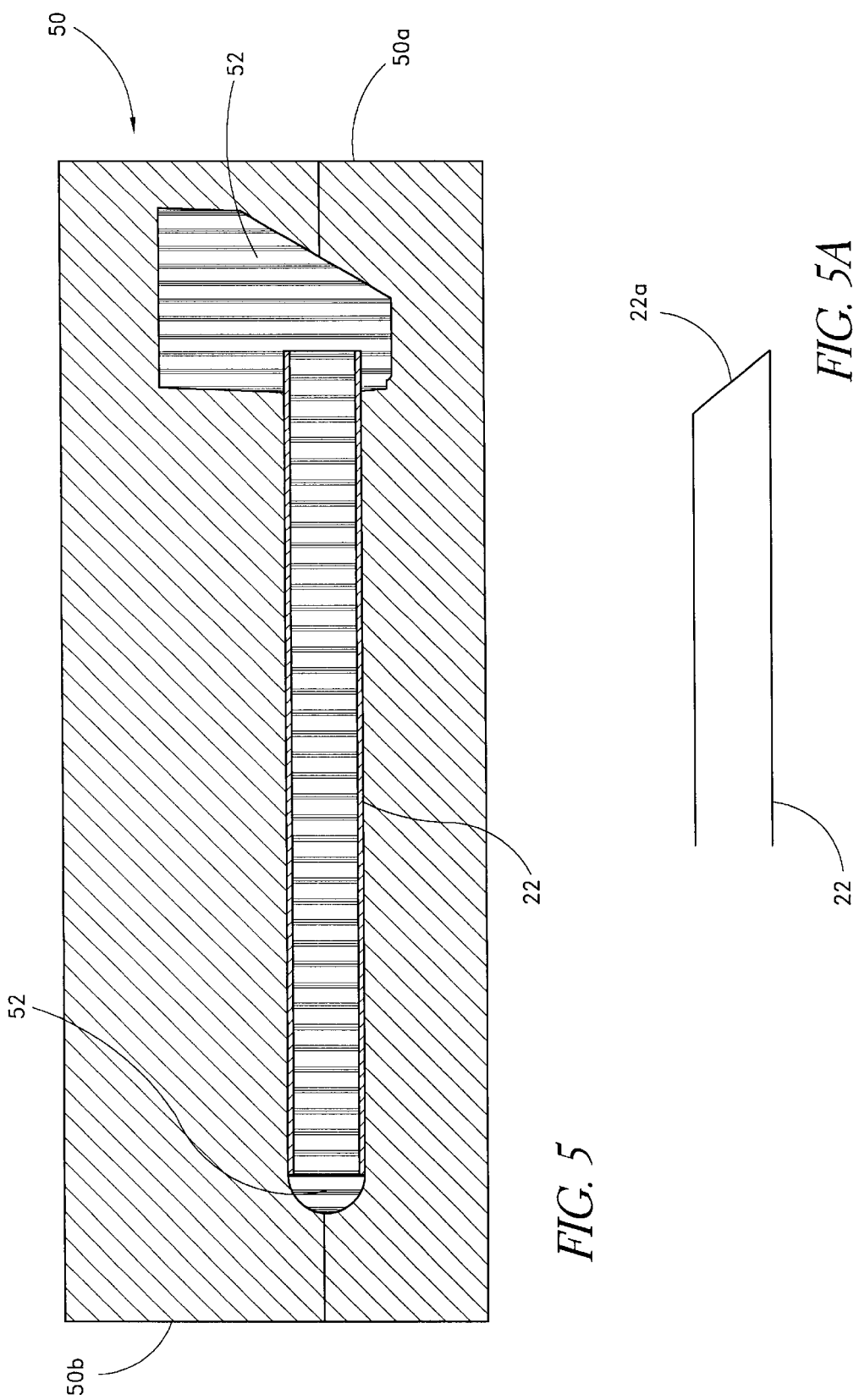
FIG. 5 is a cross-sectional schematic view of a support tube within one end in an injection mold.
FIG. 5a is a schematic cross-sectional view of a variation of the lower end of the support tube of FIG. 5.

FIG. 5 schematically illustrates a cross section of a mold 50 for injection molding the base 24 of FIG. 3. As can be seen, one end of the support tube 22 is inserted through an opening in a wall of the base portion 50a of the mold 50, and the other end is in a top portion 50b. The central portion of the mold 50 also positions the tube. When plastic 52 is injected into the base mold portion 50a in conventional fashion, plastic fills the mold portion 50a to create the base, but in addition, plastic 52 flows through the open tube itself and out the other tube end to be shaped by the portion 50b, to thereby create the desired unitized, stable structure. This arrangement not only offers the necessary support, but it limits the need for a clamp and the attendant installation and loosening problems. To facilitate flow of plastic into the base end of the tube 22, the end 22a may be cut at an angle, as shown in FIG. 5a.

Figure 6:
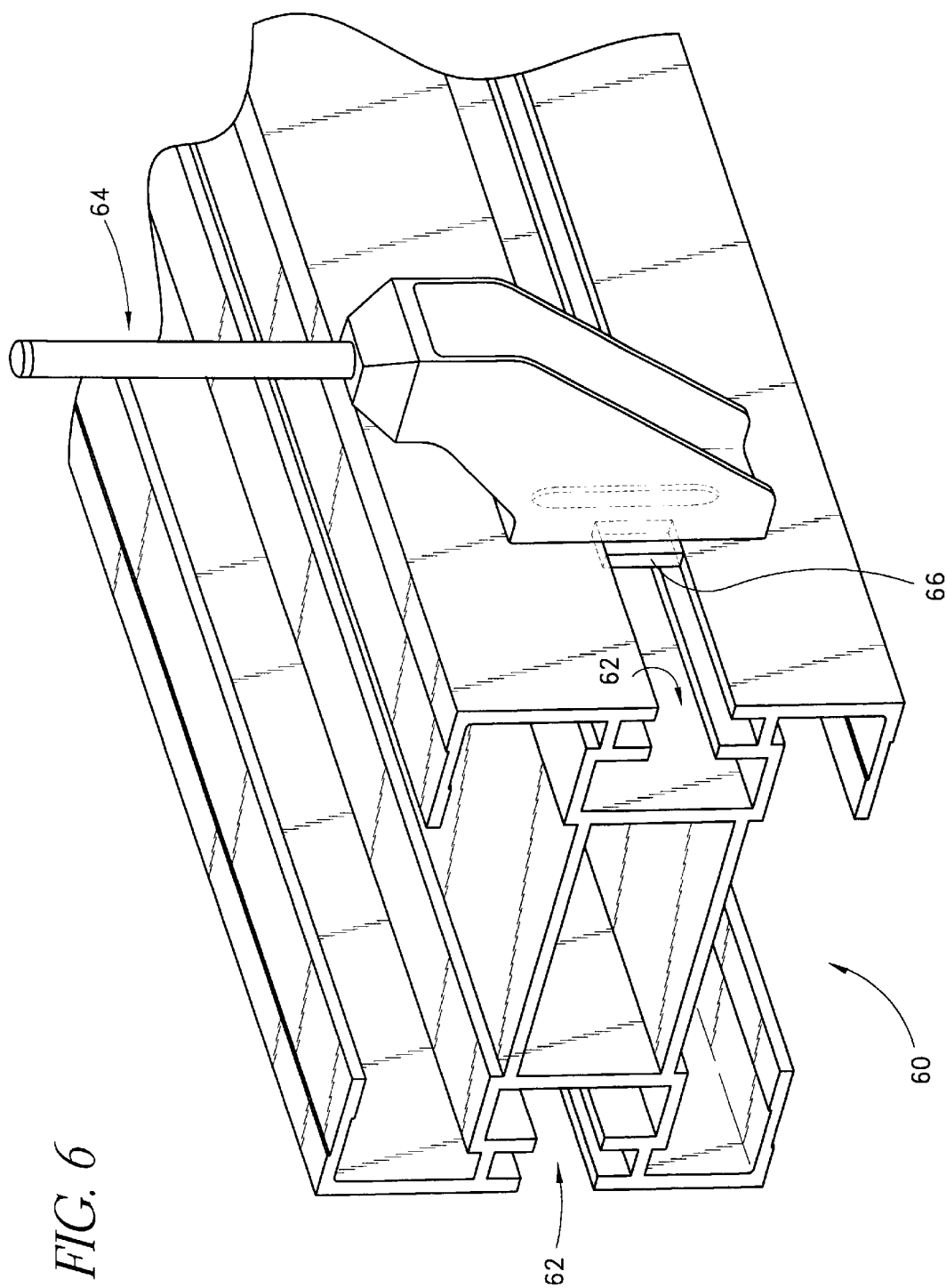
FIG. 6 is a schematic view illustrating a variation of a conveyor frame and a variation of the upright illustrated in FIG. 4.

FIG. 6 shows a cross-section of an extruded conveyor support or frame 60 having an elongated slot or channel 62 on each side. Mounted to the frame is an upright 64 of the type illustrated in FIG. 4 with the addition of one or more inwardly extending bosses 66. As seen from FIG. 6, the boss is sized to fit snugly within the slot 62. The boss has upper and lower edges which engage the slot edges. This approach provides additional stability to the upright by preventing it from rotating about an axis through the lower end of the upright and perpendicular to the frame 60.

While utilizing an upright having a tubular lower end is perhaps the simplest form of the invention, it should be recognized that the lower end of the support member could have a variety of configurations that will interengage satisfactorily with the plastic during the injection molding operation so as to securely fix the support to prevent movement of the support relative to the plastic base. Also, tubes of various cross sections may be employed, including, of course, straight sided ones that prevent rotation. However, a circular cross section is usually preferred in order to obtain the maximum range of orientation for the clamp to be attached to the upper end of the tube.

Although this invention has been disclosed in the context of certain preferred embodiments and example, it will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described above, but should be determined only by a fair reading of the claims that follow.

What is claimed is:

1. A support for use in a conveyor system, the support comprising:
    a base portion adapted to be mounted to a conveyor frame;
    an elongate rod extending from the base and having an inner rod portion and an outer tube portion;
    the elongate inner rod portion having a proximal end unitarily formed with the base portion, and a distal end comprising a cap; and
    the outer tube portion surrounding said inner rod portion, said outer tube portion having a proximal end embedded in the base portion such that the base portion surrounds a section of the proximal end of the outer tube portion, and said outer tube portion having a distal end adjacent said cap.

2. The support of claim 1, wherein the base portion and the inner rod portion comprise a unitary piece of a thermoplastic material.

3. The support of claim 1, wherein the outer tube portion comprises a steel tube.

4. The support of claim 1, wherein the outer tube comprises a circular cross-section.

5. The support of claim 1, wherein the outer tube portion comprises a longitudinal axis, and wherein a plane taken through the proximal end of the outer rod does not form a right angle with the longitudinal axis.

6. The support of claim 1, wherein a diameter of said cap is at least as large as a diameter of said outer tube portion.

7. The support of claim 1, wherein the base portion comprises at least one hole in transverse relation to a longitudinal axis of the inner rod portion.

8. The support of claim 1, wherein the outer tube portion is substantially restricted from rotation relative to the base portion.

9. The support of claim 1, wherein said inner rod portion comprises substantially the same cross sectional shape as the outer tube portion.

10. A conveyor bracket comprising:
    a base member configured to attach said bracket to a conveyor frame;
    an elongate rod extending from said base member; and
    a tube surrounding a portion of said elongate rod, a portion of said tube being fixed within and surrounded by said base member;
    wherein a unitary piece of material comprises the elongate rod and the base member.

11. The bracket of claim 10, wherein the unitary piece of material further comprises a cap at an end of said elongate rod spaced from said base member.

12. The bracket of claim 10, wherein the tube is made of metal.

13. The bracket of claim 10, wherein the tube is restrained from rotation relative to the base member.

14. The bracket of claim 10, wherein said portion of said tube fixed within said base member comprises a plane which does not form a right angle relative to a longitudinal axis of said tube.

15. The bracket of claim 10, wherein the base member comprises at least one hole for receiving a fastener.

16. A method of manufacturing a support for use in a conveyor system, the method comprising the steps of:
    providing a mold adapted to produce the support, said support including a mounting portion and an elongate portion extending from said mounting portion and terminating at a distal end cap;

preparing a tube for insertion into a cavity within said mold;

placing said tube within said cavity of said mold such that a proximal end of said tube extends at least partially into a portion of said mold adapted to form said mounting portion; and introducing a molten plastic material into said cavity of said mold, thereby forming said mounting portion, encasing said proximal end of said tube, filling said tube, and forming the distal cap with said plastic material.

17. The method of claim 16, wherein the tube is made of metal.

18. The method of claim 16, wherein the step of preparing a tube further comprises cutting the proximal end of the tube to form an edge comprising a plane which is not perpendicular to a longitudinal axis of the tube.

19. The method of claim 16, wherein the tube comprises a circular cross-section.

20. The method of claim 16, wherein the mounting portion comprises an aperture for receiving a fastener.

21. A method of manufacturing a support for use in a conveyor system, the method comprising the steps of:

providing a mold configured to produce the support, said support including a mounting portion and an elongate portion extending from said mounting portion and terminating at a distal end cap;

preparing a tube for insertion into a cavity within said mold;

suspending said tube within said cavity of said mold such that a proximal end of said tube extends at least partially into a portion of said mold configured to form said mounting portion; and introducing a thermoplastic material into said cavity of said mold, thereby encasing said proximal end of said tube, filling said tube, and forming the distal cap with said thermoplastic material;

wherein the step of preparing a tube further comprises cutting the proximal end of the tube to form an edge comprising a plane which is not perpendicular to a longitudinal axis of the tube.

* * * * *